United States Patent [19]

Huggins et al.

[11] Patent Number: 5,921,563
[45] Date of Patent: *Jul. 13, 1999

[54] QUICK RELEASE INTEGRATED COLLET AND CHUCK DEVICE

[75] Inventors: Mark S. Huggins, Clemson; Kenneth M. Montjoy, Seneca; Richard L. Marcengill, Walhalla, all of S.C.

[73] Assignee: Power Tool Holders Incorporated, Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/837,591

[22] Filed: Apr. 21, 1997

[51] Int. Cl.⁶ .............................. B23B 31/20; B23B 31/14
[52] U.S. Cl. .............................. 279/131; 279/51; 279/58; 279/904
[58] Field of Search .............................. 279/51, 54, 58, 279/131, 904

[56] References Cited

U.S. PATENT DOCUMENTS

| | | | |
|---|---|---|---|
| 2,367,863 | 1/1945 | Grey | 279/131 |
| 2,495,050 | 1/1950 | Banker | 279/131 |
| 2,686,682 | 8/1954 | Csaki | 279/131 |
| 3,625,528 | 12/1971 | Sage | 279/131 |
| 4,017,203 | 4/1977 | Marantette et al. | 408/240 |
| 4,032,163 | 6/1977 | Holt | 279/37 |
| 5,324,050 | 6/1994 | Kanaan | 279/46.7 |
| 5,820,136 | 10/1998 | Han et al. | 279/131 |

*Primary Examiner*—Steven C. Bishop
*Attorney, Agent, or Firm*—Dority & Manning

[57] ABSTRACT

A quick release chuck device includes a body member having a frusto-conical chamber defined therein for receipt of a conventional collet. A plurality of weighted cam members are disposed around the circumference of the body member and include a first end which is pivotally mounted to the body member. The cam members have a center of gravity longitudinally spaced from the pivot point wherein upon rotation of the body member in an operational mode, the cam members are caused to pivot relative to the body member and swing radially outward from the body member. A collet engaging member is disposed at a first end of the cam members and is configured to engage and move the collet into the frusto-conical chamber as the cam members swing radially outward.

19 Claims, 6 Drawing Sheets

QUICK RELEASE INTEGRATED COLLET AND CHUCK DEVICE

BACKGROUND OF THE INVENTION

The present invention relates to a chuck device for holding tool bits to a drive shaft of a power tool, and more particularly to a quick release chuck device incorporating a collet which is particularly useful on high speed devices, such as routers.

A typical conventional system used on portable stationary routers, laminate trimmers, dry wall cutters, etc., utilizes a collet tool holding device having a tapered collet that conforms to the hollow cone of the collet chuck or router motor shaft. Typically, a threaded nut is provided having a conical cam surface which matches the conical surface of the outer collet face. During operation of this type of device, the drive spindle or chuck of the machine tool must be held stationary in order to tighten the collet nut sufficiently. For this reason, most router chucks have, for example, spindle locks or are provided with an extra wrench that fits the chuck body or shaft. Similarly, to release the tool, the machine shaft or chuck body must be held stationary while the nut is loosened in the counterclockwise direction. This known conventional system has a number of drawbacks, for example, the tightening and loosening procedures have proven to be cumbersome and require a means, such as a separate wrench, for locking the spindle shaft. Also, with the conventional systems, the operator must physically tighten the nut onto the collet in very tight or close proximity to the sharp cutting edges of the tool bit carried by the collet.

Various attempts have been made in the art to provide an improved chuck device for high speed machine tools, particularly routers and the like. U.S. Pat. No. 5,511,801 issued to Kanaan et al., for example, provides a significant improvement in the art. The '801 patent discloses an integrated collet and chuck device which is actuated by turning a sleeve relative to a body member, with the sleeve having a nut fixed therein. The nut engages a screw member which is rotatably concentric within the nut. Rotation of the nut drives the screw member in the longitudinal direction and the screw member engages a collet thereby causing the collet to grip on a tool shank.

U.S. patent application Ser. No. 08/456,184, now abandoned, to Kanaan et al. discloses another quick release chuck device which is particularly useful on high speed tools. This device is actuated by a spring biased sleeve member which is moveable relative to a body member. Tapered pins are seated within tapered slots defined in the body member and contact and grip a tool shank inserted into the device in a spring biased position of the sleeve member.

U.S. Pat. No. 4,692,073 to Martindell describes a chuck apparatus for power bits utilizing a spring biased sleeve disposed about the drive spindle for axially securing the power bit to the chuck apparatus.

The present invention provides an improvement to the state of the art of quick release chuck devices utilizing a collet.

OBJECTS AND SUMMARY OF THE INVENTION

Therefore, a principal object of the present invention is to provide a quick release chuck device incorporating a collet for securing a tool bit or working device to a drive spindle of a machine tool.

A further object of the invention is to provide an integrated collet and chuck device which does not require a threaded or rotational screw member or nut for actuating the collet.

And yet a further object of the present invention is to provide a centrifugal force actuated collet and chuck device.

Still another object of the present invention is to provide an improved chuck device for machine tools, particularly high speed machine tools such as routers, laminate trimmers, dry wall cutters, and the like.

Additional objects and advantages to the invention will be set forth in part in the description which follows and in part will be obvious from the description, or may be learned through practice of the invention. The objects and advantages of the invention may be realized and obtained by means of the instrumentalities and combinations particularly pointed out in the appended claims.

To achieve the objects, and in accordance with the purposes of the invention, a quick release chuck device is provided which includes a body member having a frusto-conical chamber defined therein for receipt of a conventional collet device operably housed in the frusto-conical chamber. A plurality of weighted cam members are disposed equally spaced around the circumference of the body member. The cam members have a first end which is pivotally mounted to the body member by way of a partial ball and socket type of mechanism. Preferably, the cam members comprise a ball joint at the first end which rests in radial sockets or recesses defined in an annular sleeve which surrounds the body member. The cam members pivot about a pivot point generally corresponding to the center of the ball joints. The cam members have a center of gravity which is longitudinally spaced from the ball joints wherein upon rotation of the body member in an operational mode of the chuck device, the cam members are caused to pivot relative to the body member and swing radially outward from the body member due to centrifugal force.

A collet engaging member is configured with the cam members to engage and move the collet device into the frusto-conical chamber as the cam members swing radially outward from the body member. The collet engaging member may comprise tabs or other protruding members formed on the cam members and spaced from the ball joint. The tabs may be radially spaced from the center of the ball joint, and may also be longitudinally spaced from the center of the ball joint.

The cam members preferably have a shape and a weight so that the center of gravity of the cam members is at a longitudinal distance from the center of the ball joint or pivot point to create a first moment arm. The collet engaging members are at a radial distance from the pivot point of the cam members thereby defining a second moment arm. The configuration of the cam members and relationship between the moment arms is such that an advantageous mechanical advantage is generated by movement of the cam members in the radially outward direction upon rotation of the body member in an operational mode of the chuck device. Preferably, the cam member has a weight and configuration so that a mechanical advantage of at least 3.5 is generated. It should be understood that the cam members can have any desired shape so long as the weight, location of the center of gravity, distance from the centerline rotational axis of the body member, and ratio of the moment arms all combine to produce the desired mechanical advantage. Accordingly, various modifications of the cam members are well within the level of those skilled in the art.

The device also includes a sleeve member which is mounted for longitudinal movement relative to the body member. Preferably, the sleeve member is spring-biased relative to the body member or a cap member fixed on the body member. The sleeve member includes a flange or other type of member disposed to contact the cam members when the sleeve is moved relative to the body member. This motion causes the cam members to swing radially toward the body member whereby the collet engaging members of the cams move away from the collet allowing a tool shank to be inserted into the collet.

Resilient members, for example springs or a resilient material, are radially disposed between the cam members and the body member. The springs may be housed in recesses defined in the cam members and body member. The cam members swing radially towards the body member against the bias of the springs to allow a tool shank to be inserted into the collet device as described above. Additionally, the springs provide an initial radially outward bias to the cam members so that in a static state of the device, the cam members force the collet device at least partially into the frusto-conical chamber to provide a static gripping force on a tool shank held in the collet. Preferably, the springs are sized and located to provide a static gripping force that will not permit removal of a tool bit inserted into the collet in the static state of the device unless the sleeve member is manually moved by the operator.

The device also includes means for mounting the body member to a drive spindle of a machine tool, such as a router. Any conventional mounting means or device may be utilized in this regard. For example, a threaded stem portion or receiving portion, conventional tapered shank connecting means, set screws, etc., are all within the scope of the invention.

It should also be understood that any conventional collet device can be utilized in the present invention, such as a conventional split-steel collet, or Rubber-Flex® by Jacobs® Chuck Manufacturing Company of Clemson, S.C.

The accompanying drawings, which are incorporated in and constitute a part of the specification, illustrate embodiments of the invention and, together with the description serve to explain the principles of the invention.

DESCRIPTION OF THE PREFERRED EMBODIMENTS

Reference will now be made in detail to the presently preferred embodiments of the invention. One or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the appended claims and their equivalents. The numbering of components in the drawings is consistent throughout the application, with the same components having the same number in each of the drawings.

Figure 6:
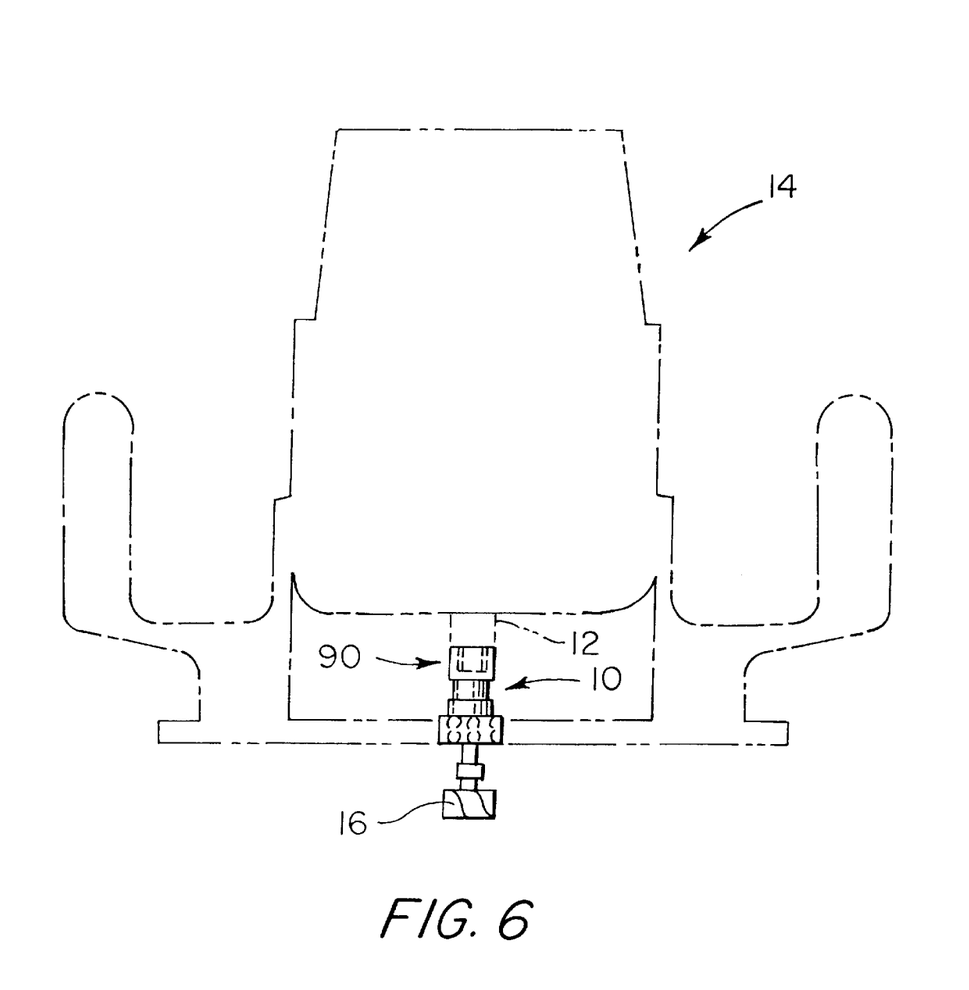
FIG. 6 is a diagrammatic view illustrating the device used in one preferred embodiment.

A quick release integrated collet and chuck device, generally 10, is illustrated generally in FIG. 6 in one application of the invention wherein it is mounted to a drive spindle 12 of a power tool, such as a router 14. Device 10 is used for holding a tool bit 16 relative to the drive spindle 12. It should be understood that the present invention has any number of uses, and may be used wherever it is desired to attach a tool bit to a drive spindle, and in particular in applications where the gripping strength and accuracy of a collet device is desired. The present invention is particularly useful in high speed applications, such as with routers, laminate trimmers, dry wall cutters, etc. It should be understood that the present description is in no way meant as a limitation of the field of use of the present device.

Figure 1:
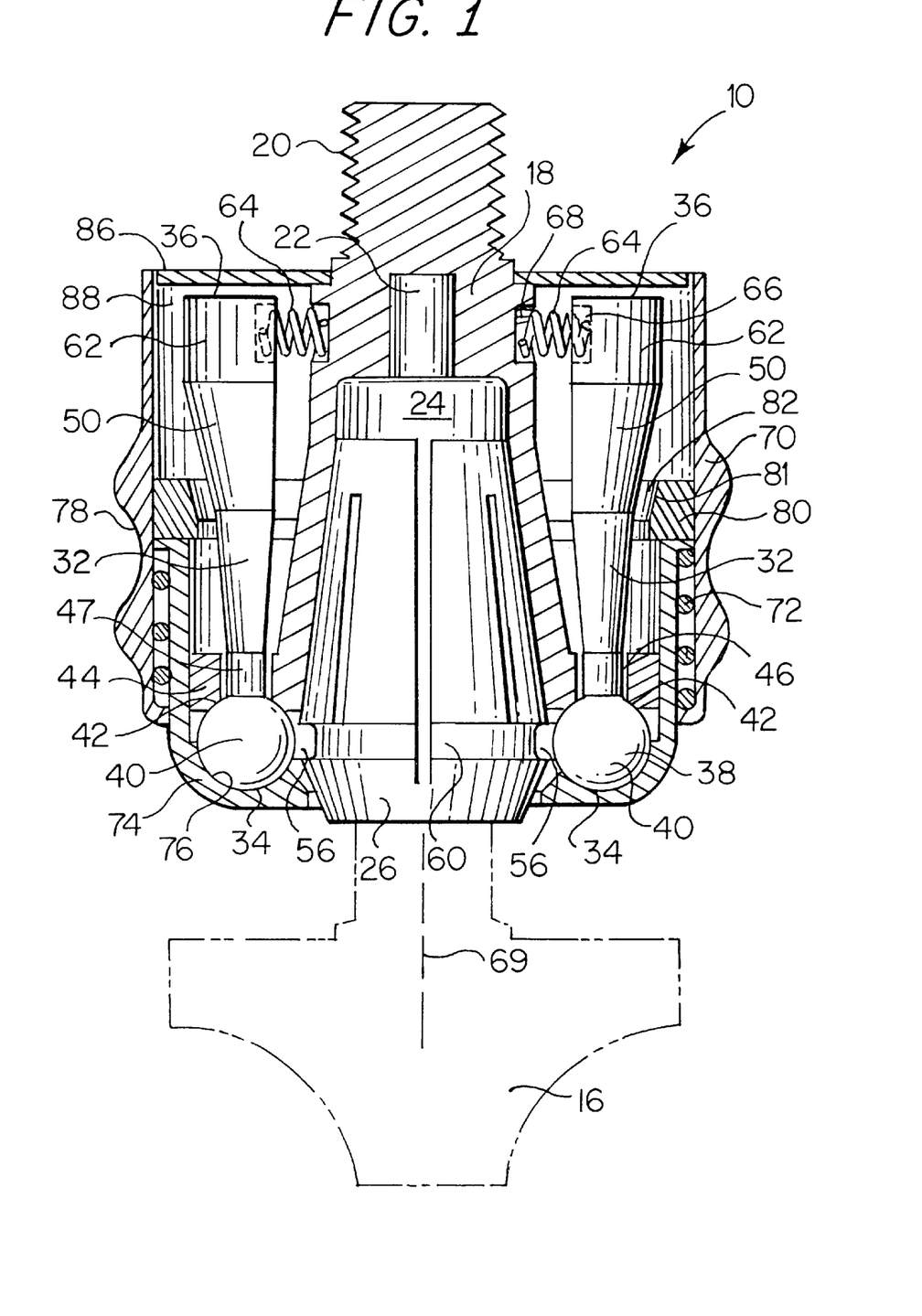
FIG. 1 is a cross-sectional view of the integrated collet and chuck device according to the invention.
Figure 5:
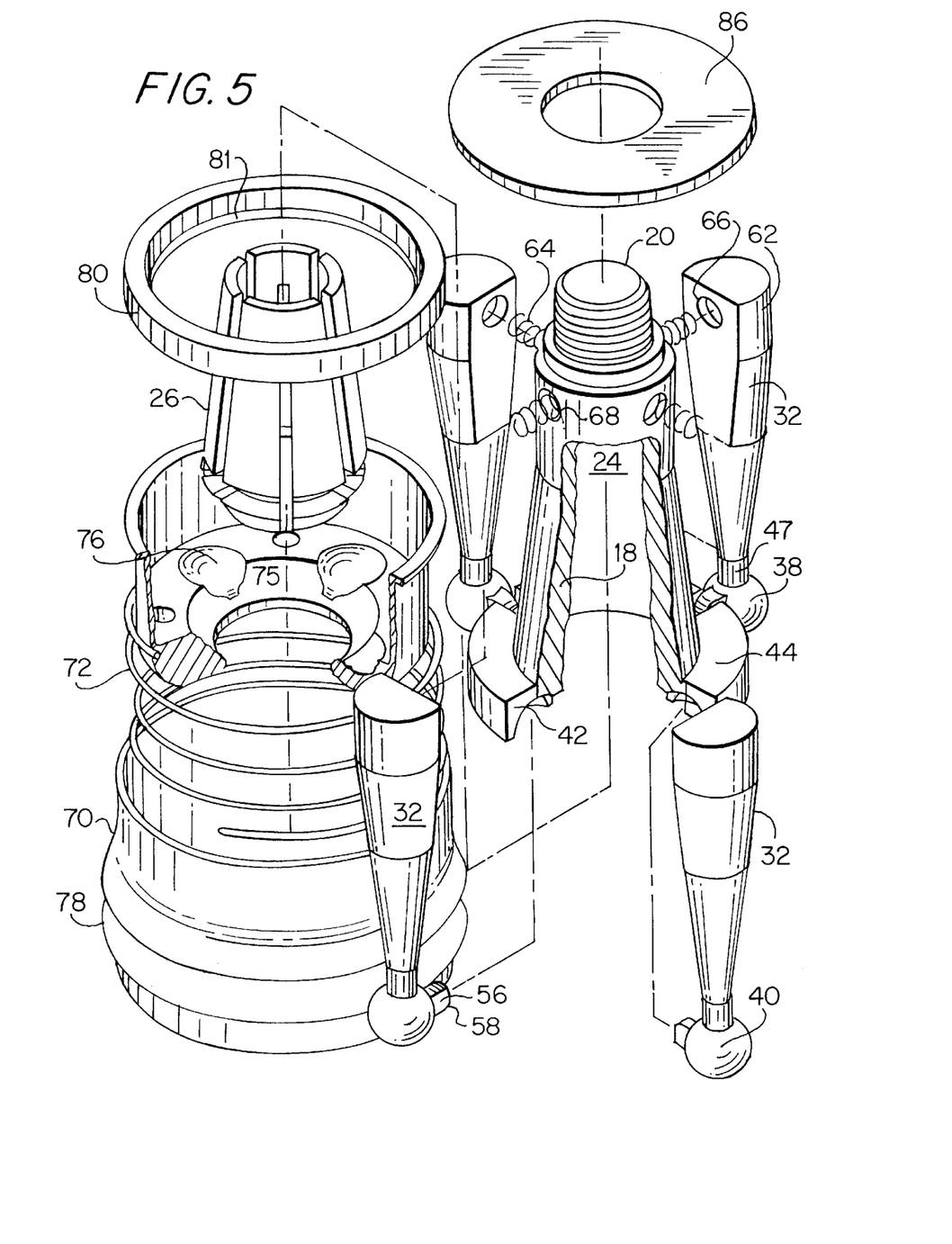
FIG. 5 is an in-line component view of the apparatus according to the invention.

Referring to FIGS. 1 and 5 in particular, device 10 includes a body member 18. Body member 18 is configured to be mounted to a drive spindle 12 of a power tool, such as the router 14 illustrated in FIG. 6. In this regard, body member 18 includes any suitable means for mounting to drive spindle 12. In the embodiment illustrated, the mounting means includes a threaded stem portion 20 for threaded engagement with drive spindle 12. Preferably, stem portion 20 is solid to provide strength and rigidity to the device, but may contain a blind hole 22 so that device 10 can be mechanically threaded onto the drive spindle by, for example, a torx power driver. It should be understood, however, that any conventional mounting device or system may be utilized to mount body member 18 to the drive spindle. For example, body member 18 could be attached by set screws, mechanical interlocks, screws for directly screwing the body member onto the drive shaft, a conventional tapered shank connection, or any other suitable mechanical locking means. Any and all such means are within the scope and spirit of the invention.

Body member 18 includes a frusto-conical chamber 24 defined therein. A collet device 26 is operably housed in chamber 24. Collet device 26 comprises a frusto-conical outer diameter surface which compliments the frusto-conical chamber 24. The operation of typical collets 26 is well understood by those skilled in the art and need not be described in great detail herein. In general, as collet 26 is moved rearward within body member 18, the jaws of the collet are forced against the complimenting frusto-conical surface of chamber 24 causing the jaws to collapse inward and grip a tool shank held within the collet.

Any manner or make of conventional collet may be utilized in the present invention. For example, a typical split steel collet may be utilized, as particularly shown in the figures. These well known split steel collets are formed from a continuous metal member having longitudinal slits defined therein. An alternative embodiment of a collet device 26 suitable in the present invention is the other well known type of collet comprising a plurality of individual longitudinally disposed gripping jaws held in a spaced apart relation by a resilient material between the jaws. These collets are known as Rubber-Flex® collets from Jacobs® Chuck Manufacturing Company of Clemson, S.C. It may be necessary to slightly modify the Rubber-Flexs collets by incorporating a metal ring in the groove of the collet so that the engaging members of the device (as described in greater detail below) do not engage only on the resilient material of the collet. Any alternative collet device may also be formed of a plastic or ceramic material. In any event, it should be understood that the present invention is not limited to any particular type of collet device and various modifications can be made to know collet devices to arrive at alternative collet configurations that may be suitable with the present invention.

Referring again to the figures in general, chuck device 10 includes at least two longitudinally extending cam members 32, and preferably three or four such cam members 32. Cam members 32 are disposed equally spaced around the circumference of body member 18. In the embodiment illustrated, four cam members 32 are utilized and are spaced equally around the circumference of body member 18. It should be understood, however, that a greater or lesser number of cam members 32 can be utilized. For example, three such cam members could be utilized so long as they are equally spaced around the outer circumference of body member 18. It should also be understood that some degree of "balancing" may be required with regards to the location and configuration of the cam members to ensure that the device operates smoothly and without vibration, particularly in high speed applications.

Cam members 32 are pivotally mounted relative to body member 18 at a first end 34 thereof so that an opposite second end 36 can swing radially outward relative to body member 18. In the embodiment illustrated, cam members 32 are pivotally mounted by way of a ball joint mechanism. A ball joint 38 is defined on cam members 32 generally at first end 34. Ball joint members 38 operably rest in radial sockets or recesses 42 defined in body member 18. Sockets 42 may also be formed in an annular flange 44 formed integral with body member 18, or otherwise attached to body member 18. Bores 46 are defined through recesses or sockets 42 and a neck section 47 of cam members 32 extends through bore 46.

Cam members 32 have a size and proportion so that a center of gravity 50 (depicted diagrammatically in FIGS. 1–4) of each cam member 32 is at a longitudinal distance from the pivot point 40 of the cam member. In the embodiment illustrated, pivot point 40 coincides with the center of ball joint 38. Cam members 32 may comprise a weighted section or portion 62 generally opposite first end 34. Weighted portion 62 can comprise any desired shape or configuration. It should be understood that the "weight" of cam member 32 may simply be accounted for by the length of the cam member. In this regard, weighted portion 62 is simply the longitudinally extending section of the cam member.

It should also be understood that cam members 32 can be composed of multiple connected parts. For example, ball joint members 38 could be screwed onto neck section 47, and weighted portion 62 could be removable and replaceable.

Figure 3:
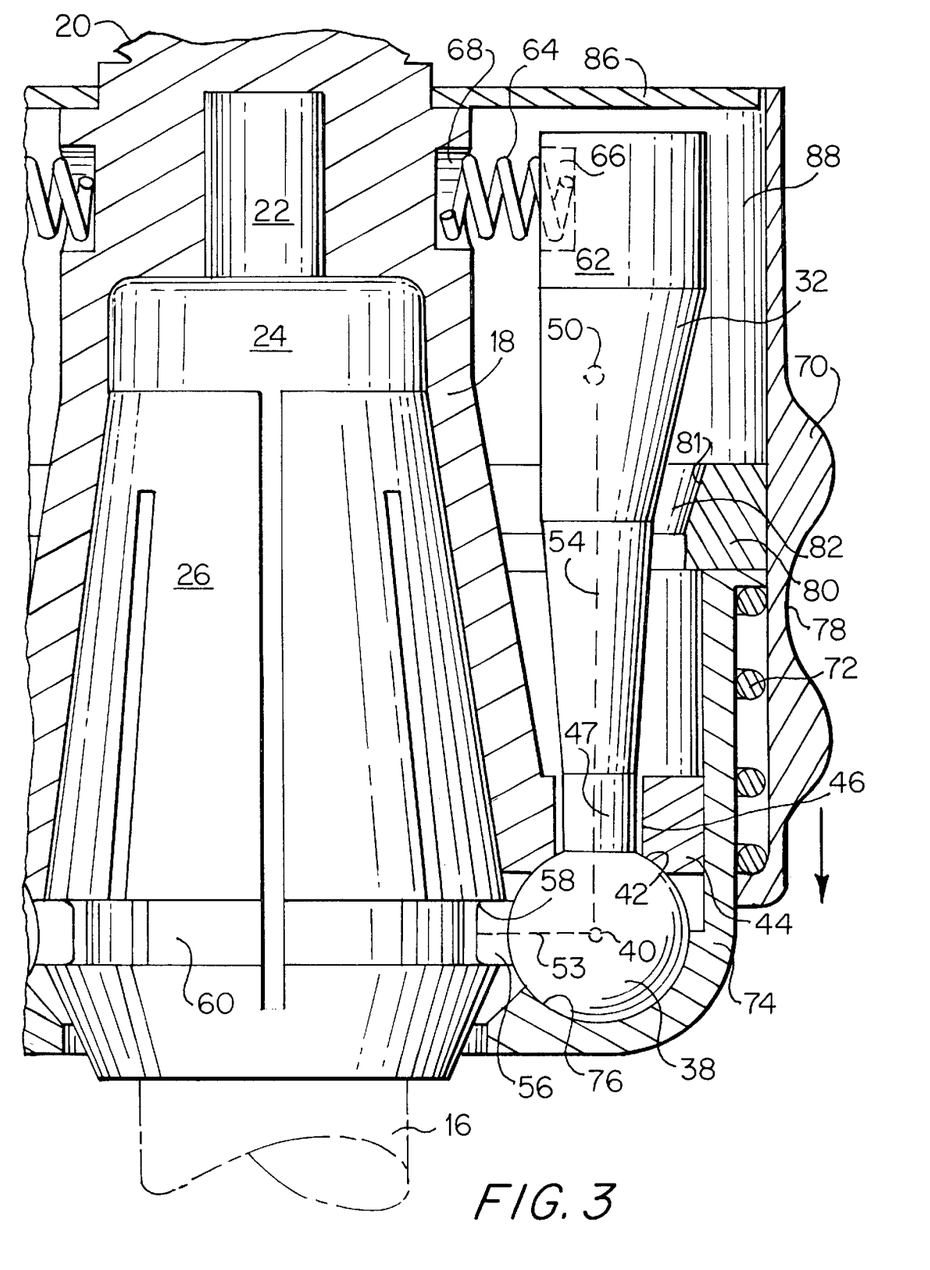
FIG. 3 is a view similar to FIG. 2 illustrating the device in the static state after insertion of the tool bit into the collet.

A first moment arm 54 is defined from center of gravity 50 to pivot point 40 for each cam member, as shown in diagram form in FIG. 3.

Device 10 also includes a collet engaging member configured with cam members 32 so as to contact and move collet device 26 rearward into frusto-conical chamber 24 when cam members 32 swing radially outward in a spinning operational mode of device 10. In the embodiment illustrated, the collet engaging member includes a plurality of tabs 56 formed directly on cam members 32. Tabs 56 preferably have radiused corners 58 which slidingly engage in conventional collet grooves 60 defined in collet device 26. Tabs 56 are radially spaced from pivot point 40 so that a second moment arm 53 (FIG. 3) is defined from tabs 56 to pivot point 40. A ratio exists between first moment arm 54 and second moment arm 53 so that a distinct advantageous mechanical advantage is generated by the radial outward movement of cam members 32. The dimensions and characteristics of cam members 32 is preferably such that the mechanical advantage generated is at least 3.5.

It should be understood that any number of factors will affect the mechanical advantage. For example, the effective moment arms can be changed by changing the weight and proportions of the cam members 32 so that the center of gravity 50 also changes. Likewise, tabs 56 may be disposed longitudinally above or below pivot point 40 which would change the effective length of first moment arm 54. Likewise, the length of second moment arm 53 can also be changed by the shape and location of the collet engaging member or tabs 56. For example, the collet engaging member 54 may comprise a separate device operably disposed between collet 26 and tabs 56. In other words, any manner of mechanical devices may be utilized to apply the force to collet device 26. The length and distance of such devices from pivot point 40 will obviously affect the length of second moment arm 53.

Applicants have found that in a preferred embodiment of the invention designed to hold a 0.500 inch bit, the distance from pivot point 40 to center of gravity 50 is approximately 0.82 inches. The distance from pivot point 40 to the end of tabs 56 is approximately 0.22 inches. The radial distance between a longitudinal center line 69 (FIG. 1) of body member 18 is approximately 0.6 inches. Preferably, four equally spaced cams 32 are utilized and each cam has a weight of approximately 0.027 pounds. With this arrangement, a mechanical advantage of approximately 3.8 is achieved, as defined by the ratio of the first and second moment arms. The shape, material, weight, etc. of the cams can vary accordingly to achieve the desired mechanical advantage.

It is important to understand, however, that the above described parameters are only one set of preferred parameters for a specific capacity (0.500 inches) device. The dimensions will obviously vary for different capacity devices. The present invention is not limited to any size or capacity and relates to all English and metric size collets. Any and all such modifications are within the scope and spirit of the invention.

Applicants have determined that a dynamic holding force of at least 130 inch-pounds of slip torque, and preferably at least 150 inch-pounds, in the dynamic or operational state of the device is preferred. The parameters recited above will produce this desired holding force. It should be understood that a variation in any of the parameters will change the overall holding force in the dynamic state. For example, if the distance between the center of gravity 50 and pivot point 40 is increased, the holding force will also increase. Likewise, if the weight of the cams increases, the holding force will correspondingly increase.

Resilient members, such as springs 64, are operably radially disposed between cam members 32 and body member 18 generally nearer second end 36. In the embodiment illustrated, springs 64 are disposed in recesses 66 defined in cam members 32 and oppositely facing recesses 68 defined in body member 18. Springs 64 provide a radially outward bias to cam members 32 so that an initial static holding force is generated in device 10 to hold a tool shank in collet device 26 even when chuck device 10 is stationary. It is preferred that this static holding force is great enough that the tool shank cannot be manually removed from collet device 26 unless cam members 32 are physically moved --radially inward against the biasing force of springs 64, as will be described in more detail below. Accordingly, the size of springs 64 should be chosen accordingly to produce the desired static holding force.

In a preferred embodiment as illustrated in the figures, device 10 further includes a spring-biased outer sleeve member 70. Sleeve member 70 is spring biased in the longitudinal direction by means of a spring 72 or other resilient member. Spring 72 is disposed around the circumference of a cap member 74 which is attached to body member 12, by way of for example, screws or a press fit or other suitable means. Cap member 74 also includes radial recesses 76 for housing a portion of ball joints 38 recess 76 includes a portion 75 to accommodate tabs 56 or cam members 32. Cap member 74 may be removably attached to body member 18 so that collet device 26 can be interchanged with different size collets.

Figure 2:
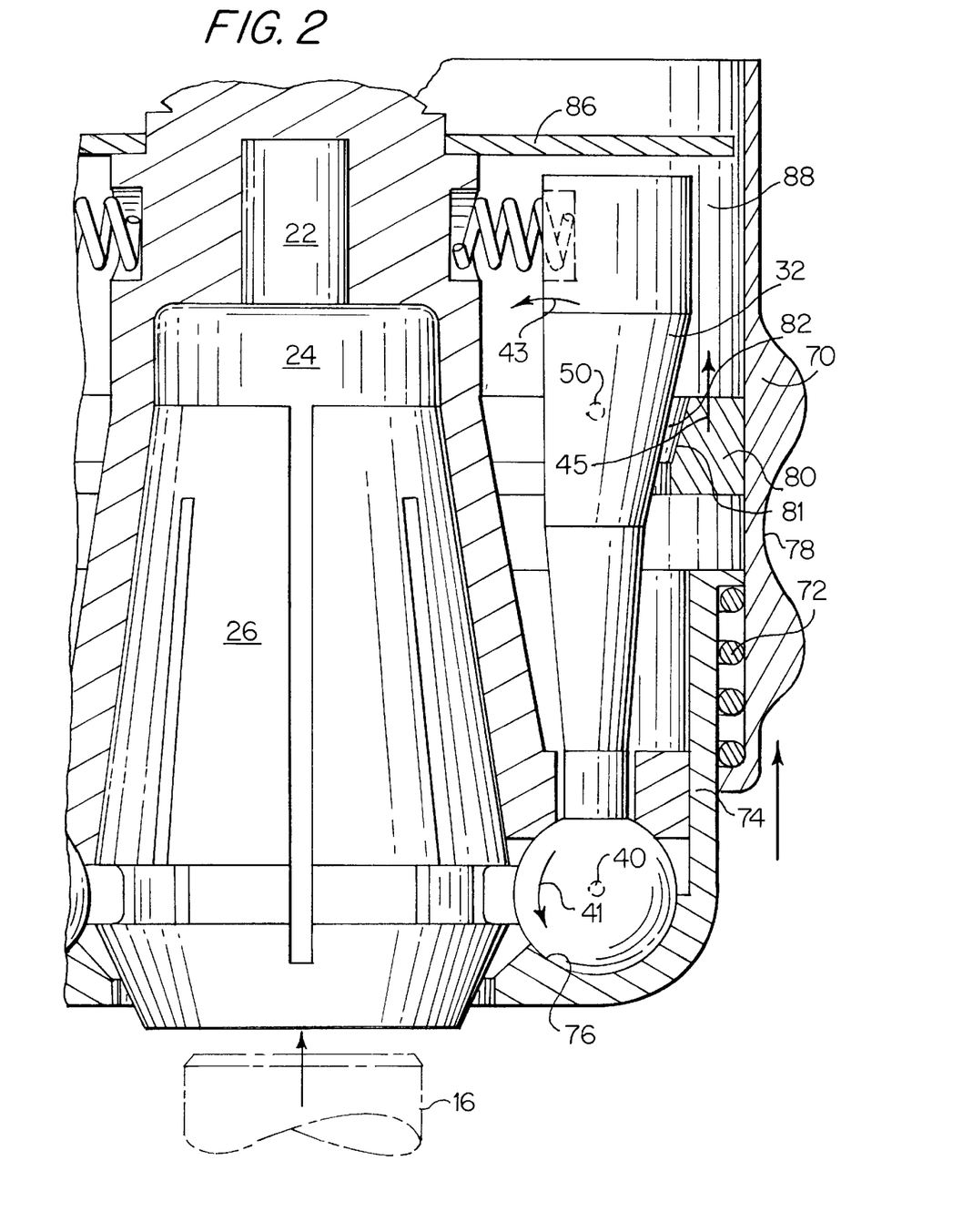
FIG. 2 is a cross-sectional partial view of the apparatus shown in FIG. 1 particularly illustrating the apparatus upon insertion of a tool bit into the collet.

Outer sleeve member 70 is preferably formed of a relatively aesthetically pleasing material, such as a plastic material, and comprises a grip enhancing surface such as gripping recesses 78 formed therein to assist in manual operation of the device. A cam contacting flange 80 or other appropriate member is press-fitted or otherwise fixed inside of sleeve 70 and is movable therewith. Flange 80 has a surface 81 with a shape complimenting that of cam members 32. In order to insert a tool shank into device 10, an operator grasps outer sleeve member 70 and moves the sleeve rearward against the biasing force of spring 64, as shown in FIG. 2. As sleeve 70 moves rearward, surface 81 of flange 80 will contact cam members 32 and force the second end of cam members 32 to move radially inward towards body member 18, as shown by arrow 43 in FIG. 2. This motion causes tabs 56 to pivot away from body member 18, as shown by arrow 41 in FIG. 2, and, in so doing, tabs 56 "pull" collet device 26 out of frusto-conical chamber 24 to an extent necessary to allow a tool shank to be inserted into the collet. Once the tool shank is inserted into collet device 26, the operator releases outer sleeve 70 which spring returns to its static position due to spring 72, as shown in FIG. 3. In this static position, springs 64 provide enough static holding force that the tool shank cannot be removed from collet device 26 unless the operator again grasps and moves sleeve 70 rearward.

Figure 4:
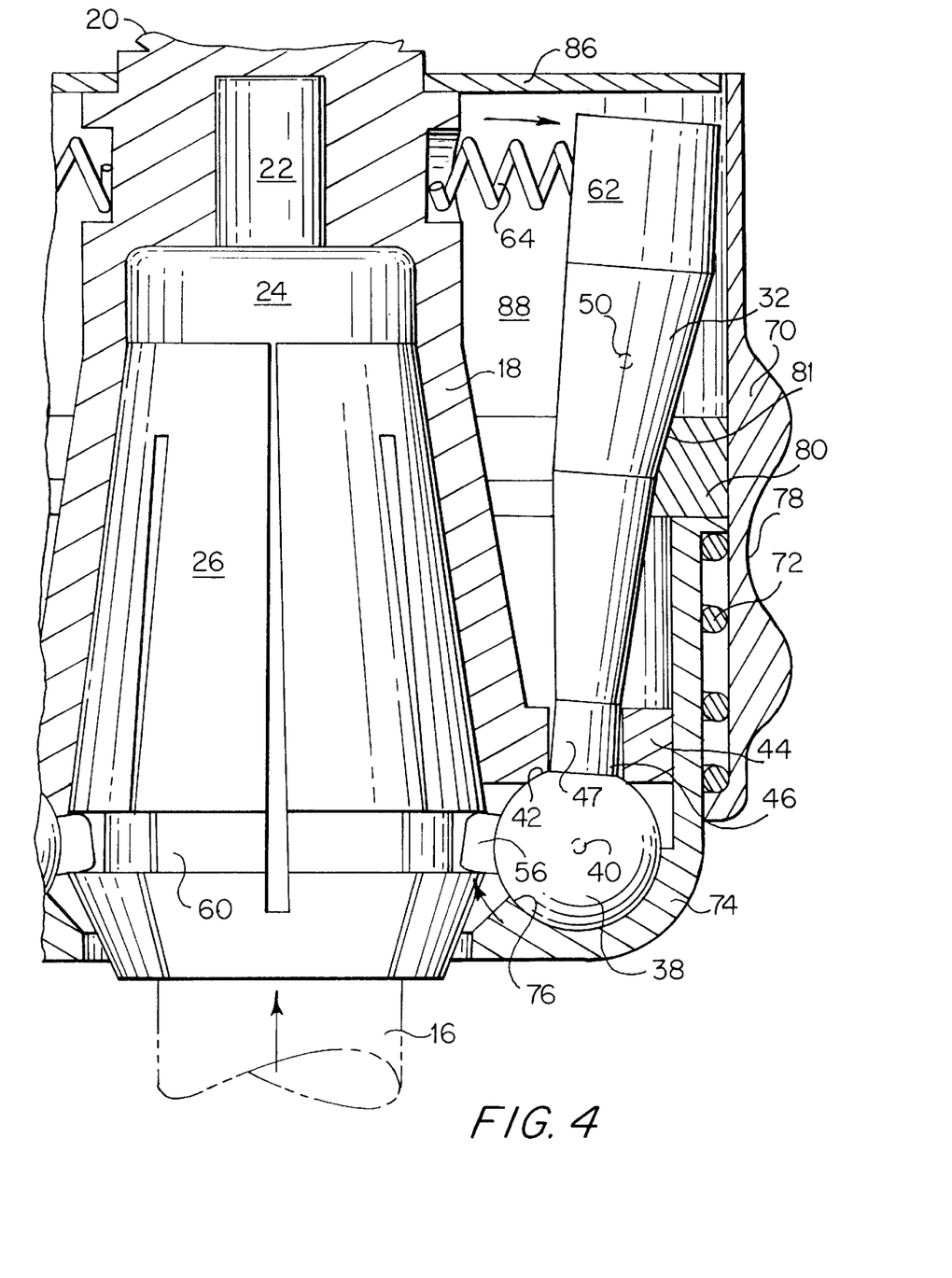
FIG. 4 is a cross-sectional partial view of the apparatus particularly illustrating the device in the operational mode.

A radial distance is defined between surface 81 of cam 80 and cam members 32 in the static mode of the device, as particularly seen in FIG. 1. This radial distance 82 defines the degree of radial outward movement of cams 32 in the dynamic or operational mode of the device wherein body member 18 is rotationally driven by the power tool, as particularly illustrated in FIG. 4. FIG. 4 illustrates cam member 32 at its maximum radially outward pivoted position. It should be understood that the power tool must be driven at a minimum rotational speed to generate enough centrifugal force to cause cam members 32 to move to the position shown in FIG. 4. In this position, tab 56 is pushing collet device 26 into frusto-conical chamber 24 to the maximum extent possible. Radial distance 82 should be selected to provide a degree of tolerance to the device. For example, applicants have found that a 0.002 inch tolerance is preferred so that for a collet designed to hold a 0.500 inch bit, radial distance 82 is great enough to allow cam members 32 to still hold a tool bit with a diameter of 0.498 inches in the static state while still allowing room for the cam members 32 to move radially outward in the dynamic state to generate the desired dynamic gripping strength. However, the radial distance should not be so great that the cam members will "crush" the collet in the dynamic state if no tool shank is inserted into the collet. In other words, radial distance 82 limits the degree of collapse of the collet jaws when no tool is inserted into the collet.

An annular space 88 is defined by sleeve member 70 and body member 18 wherein second end 36 of cam members 32 is allowed to pivot or swing radially relative to body member 18. Annular space 88 is closed by a flange 86 which is press fitted or otherwise attached to body member 18. Flange 86 prevents dust, dirt, or other debris from entering device 10 and fouling the working mechanisms thereof. Flange 86 also acts as a safety device to retain all of the elements in the interior of the device in the event of a catastrophic failure of the device.

It should be apparent to those skilled in the art that various modifications and variations can be made in the apparatus of the present invention without departing from the scope or spirit of the invention. Thus, it is intended that the present invention cover such modifications and variations of the invention as come within the scope and spirit of the appended claims and their equivalents.

What is claimed is:

1. A quick release chuck device, comprising:
   a body member;
   a frustoconical chamber defined in said body member;
   a collet device operably housed in said frustoconical chamber;
   a plurality of weighted cam members disposed equally spaced around the circumference of said body member, said cam members comprising a first end pivotally mounted to said body member with at least a partial ball socket mechanism, said cam members comprising a center of gravity longitudinally spaced from said ball socket mechanism wherein upon rotation of said body member in an operational mode of said chuck device said cam members are caused to pivot relative to said body member and swing radially outward from said body member; and
   a collet engaging member disposed generally nearer said first end of said cam members and configured to engage and move said collet device into said frustoconical chamber as said cam member swings radially outward from said body member.

2. The device as in claim 1, wherein said ball socket mechanism comprises a ball joint configured at said first end of said cam members, and receiving sockets for said ball joints defined in said body member.

3. The device as in claim 1, wherein said body member comprises an annular flange member, said receiving sockets defined in said flange member.

4. The device as in claim 1, wherein said cam members comprise a pivot point at said first ends, said cam members having a shape and weight so that a first moment arm is defined from said pivot point to said center of gravity, said collet engaging members radially spaced from said pivot point so that a second moment arm is defined between said pivot point and said collet engaging members, said first and second moment arms having a ratio so that a mechanical advantage of at least 3.5 is generated by radial outward movement of said cam members upon rotation of said body member.

5. The device as in claim 4, wherein said center of gravity of said cam members is at a radial distance of generally at least 0.5 inches from a centerline longitudinal axis through said body member.

6. The device as in claim 4, wherein said cam members comprise a ball joint at said first ends, said pivot point being at the center of said ball joint and at a distance from said collet engaging member of generally at least 0.15 inches.

7. The device as in claim 4, wherein cam members comprise a ball joint at said first ends with said pivot point being at the center of said ball joint, said cam members having a shape and weight so that said center of gravity of said cam members is at a longitudinal distance of generally at least 0.7 inches from a center of said ball joint and a radial distance of from generally 0.5 inches from a rotational longitudinal centerline of said body member.

8. The device as in claim 1, further comprising a sleeve member longitudinally movable relative to said body member, said sleeve member comprising a member for contacting said cam members as said sleeve member is moved relative to said body member thereby causing said cam members to swing radially towards said body member to allow a tool shank to be inserted into said collet device.

9. The device as in claim 8, wherein said sleeve member is spring biased.

10. The device as in claim 9, further comprising a cap member fixed to said body member and partially coaxial with said sleeve member, and a spring member disposed between said cap member and said sleeve member wherein said sleeve member is movable longitudinally relative to said body member and said sleeve member against a biasing force of said spring member.

11. The device as in claim 1, further comprising resilient members operably radially disposed between said cam members and said body member to provide a radially outward bias to said cam members, said cam members swingable radially towards said body member against the bias of said resilient members to allow a tool shank to be inserted into said collet device.

12. The device as in claim 11, further comprising an axially biased sleeve member disposed around said cam members, said sleeve member longitudinally movable relative to said body member to contact and move said cam members radially inward against the bias of said resilient members.

13. The device as in claim 11, wherein said resilient members are sized to initially bias said cam members radially outward so that a static holding force is generated by said collet device on a tool shank held therein.

14. A quick release chuck device, comprising:

a body member;

a frustoconical chamber defined in said body member for receipt of a collet device therein;

a plurality of weighted cam members disposed equally spaced around the circumference of said body member, said cam members comprising a ball joint pivotally mounted in receiving sockets defined in said body member, said cam members comprising a center of gravity longitudinally spaced from said ball joint wherein upon rotation of said body member in an operational mode of said chuck device said cam members are caused to pivot relative to said body member at said ball joints and swing radially outward from said body member; and a collet engaging member radially disposed from said ball joints on said cam members and configured to engage and move a collet device disposed in said frustoconical chamber as said cam member swings radially outward from said body member.

15. The device as in claim 14, further comprising a sleeve member longitudinally movable relative to said body member, said sleeve member comprising a member for contacting said cam members as said sleeve member is moved relative to said body member thereby causing said cam members to swing radially towards said body member to allow a tool shank to be inserted into said collet device.

16. The device as in claim 14, wherein said cam members comprise a shape and weight so that said center of gravity thereof is at a longitudinal distance from a center of said ball joint and said ball joint is at a radial distance from said collet engaging member so that a mechanical advantage of generally at least 3.5 is generated by said cam members.

17. The device as in claim 16, wherein said center of gravity is at a longitudinal distance from said ball joint center of generally at least 0.7 inches, and ball joint is at a distance from said collet engaging member of generally at least 0.15 inches.

18. The device as in claim 14, further comprising resilient members operably radially disposed between said cam members and said body member to provide a radially outward bias to said cam members, said cam members swingable radially towards said body member against the bias of said resilient members to allow a tool shank to be inserted into said collet device, said resilient members sized to initially bias said cam members radially outward so that a dynamic holding force of generally at least 130 inch-pounds is generated by said collet device on a tool shank held therein.

19. The device as in claim 14, further comprising means to attach said chuck device to a drive spindle of a power tool.

* * * * *